US009092496B2

(12) United States Patent
Goetz et al.

(10) Patent No.: US 9,092,496 B2
(45) Date of Patent: Jul. 28, 2015

(54) LAYERED DATA MANAGEMENT

(75) Inventors: Oliver Goetz, Altrip (DE); Michael Barth, Heidelberg (DE)

(73) Assignee: SAP SE, Walldorf (DE)

(*) Notice: Subject to any disclaimer, the term of this patent is extended or adjusted under 35 U.S.C. 154(b) by 1385 days.

(21) Appl. No.: 11/406,738

(22) Filed: Apr. 18, 2006

(65) Prior Publication Data
US 2007/0156751 A1 Jul. 5, 2007

Related U.S. Application Data

(63) Continuation-in-part of application No. 11/322,678, filed on Dec. 30, 2005, now abandoned.

(51) Int. Cl.
G06F 17/30 (2006.01)
(52) U.S. Cl.
CPC .............................. G06F 17/30575 (2013.01)
(58) Field of Classification Search
CPC .................. G06F 17/30575; G06F 17/30309
USPC ................. 707/778, 610, 616, 638, 695, 829; 709/201, 217
See application file for complete search history.

(56) References Cited

U.S. PATENT DOCUMENTS

| 6,330,073 | B1* | 12/2001 | Sciatto | 358/1.18 |
|---|---|---|---|---|
| 6,952,737 | B1* | 10/2005 | Coates et al. | 709/229 |
| 7,139,781 | B2* | 11/2006 | Young et al. | 707/657 |
| 2003/0137536 | A1* | 7/2003 | Hugh | 345/744 |
| 2003/0145041 | A1* | 7/2003 | Dunham et al. | 709/203 |
| 2003/0227487 | A1* | 12/2003 | Hugh | 345/777 |
| 2004/0153473 | A1* | 8/2004 | Hutchinson et al. | 707/104.1 |
| 2005/0223047 | A1* | 10/2005 | Shah et al. | 707/707 |
| 2005/0267901 | A1* | 12/2005 | Irlen | 707/100 |
| 2007/0011561 | A1* | 1/2007 | Ambilkar et al. | 714/758 |
| 2007/0083522 | A1* | 4/2007 | Nord et al. | 707/707 |
| 2007/0083642 | A1* | 4/2007 | Diedrich et al. | 709/224 |
| 2007/0100834 | A1* | 5/2007 | Landry et al. | 707/10 |
| 2007/0226678 | A1* | 9/2007 | Li et al. | 717/101 |

* cited by examiner

*Primary Examiner* — Robert Beausoliel, Jr.
*Assistant Examiner* — Alexandria Bromell
(74) *Attorney, Agent, or Firm* — Schwegman Lundberg & Woessner, P.A.

(57) ABSTRACT

A distributed system for administration and storage of data includes a data manager to access a local data store. Several data managers can be chained to form a layered hierarchical structure. All data layers are merged top down to form the resultant data records. Fields can be modified or added in each layer. The system is self organizing in that each data layer only knows about its superordinate data layer. The system provides scalable persistent data storage with centralized data management and the option to locally extend and modify data.

4 Claims, 2 Drawing Sheets

LAYERED DATA MANAGEMENT

RELATED APPLICATIONS

The present patent application is a Continuation-in-Part of application Ser. No. 11/322,678, filed Dec. 30, 2005 now abandoned, entitled "Layered Data Management".

FIELD OF INVENTION

The field of invention relates generally to a data management system.

BACKGROUND

Data may be centrally managed, yet user dependent. For example, an end user accessing the centrally managed data via a client in a client/server network benefits from additions, deletions, and modifications to the centrally managed data. On the other hand, the end user may have a need to customize the data on a particular level, for example, a local level. This customized data ideally should survive changes to the corresponding centrally managed data. Management of the data becomes more complicated if the management is distributed, for example, along an organizational hierarchy. Moreover, integrating data from different storage technologies presents additional challenges even if platform independence for access to the data exists. Additionally, the data management system should be highly scalable so that both small and massive amounts of data may be managed and accessed in accordance with the data management system.

There are several data access technologies, such as flat files, registries, central database systems, and distributed database management systems, for example, the Lightweight Directory Access Protocol (LDAP) and Domain Name Service (DNS), but these technologies do not solve the basic problem of providing for central administration of the data while at the same time allowing for modification of the data at another level, for example, a local (end user) level. Moreover, these technologies do not provide for the ability to merge together data that may be distributed over multiple levels. In particular, these technologies do not provide for the ability to modify fields of a single record at separate layers in the data management system and merge the fields into a single record accessible at a particular layer in the system.

BRIEF DESCRIPTION OF THE DRAWINGS

A better understanding of the present invention can be obtained from the following detailed description in conjunction with the following drawings, in which.

DETAILED DESCRIPTION

Figure 1:
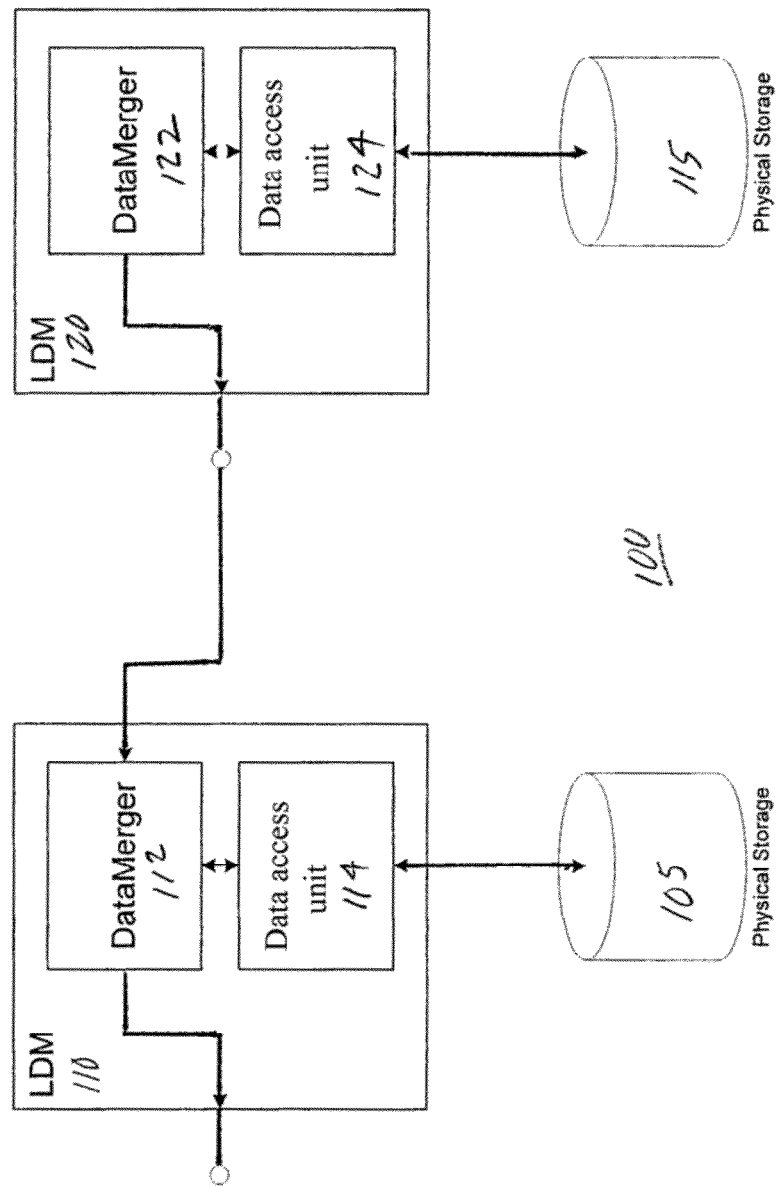
FIG. 1 illustrates an embodiment of the invention.

An embodiment of the invention provides for administration of distributed storage of data in the following manner. A layered data manager (LDM) exists at each layer of data in the distributed data management system. Each LDM has a local data store in which to store data at the layer in the distributed data management system at which the LDM exists. Each LDM may have a superordinate LDM from which it may request data. Data requested from a superordinate LDM may be merged together with data from an LDM's local data store. Thus, an LDM knows only the location of its local store and, if available, a superordinate LDM in the system. Instances of data objects may be modified and stored in a data store or source known only to the LDM at a particular layer. The merging of data is a transient process, that is, the merged data is not persistent—it is not stored in a local data store.

There is no limitation as to the number of LDMs that may be chained together in the distributed data management system. However, each LDM only communicates with its immediate superordinate LDM (the "first superordinate LDM), which in turn, may communicate directly with its immediate superordinate LDM (the "second superordinate LDM)". The first superordinate LDM may return a result to the LDM that merged data from the first superordinate LDM's local store and a result from the second superordinate LDM. Thus, in one embodiment of the invention, from the perspective of each LDM, there is only a local data store and possibly a superordinate LDM.

An example, using a distributed database of, say, restaurant guide information, illustrates the concept of overlaying and/or updating an instance of a data object. The database may contain a number of different data objects, wherein each data object may be defined to comprise a number of fields of data. In each instance of a particular data object, the fields each contain some value. In a distributed database containing restaurant guide information, a data object may represent a record containing information about a particular restaurant or restaurant chain, and the fields in the data object define various information about the restaurant, for example, restaurant name, address, phone number, type of cuisine, average entrée price, food quality, staff service, dress code, etc. Each instance of the restaurant data object, therefore, may maintain information about a particular restaurant.

A data store of information, or simply, data store, may be accessible by a layered data manager (LDM) in a network. This LDM may be superordinate or hieriarchically superior to another LDM with its own data store of the information. Thus, certain changes to a record may occur in a superordinate LDM's data store, and these changes may be merged with a query of the corresponding record in the subordinate LDM's data store. For example, if a restaurant's name and address changes, the appropriate fields in the restaurant's record in an LDM's local data store are modified to reflect the change. In one embodiment of the invention, in response to a request for information about the restaurant made to the subordinate LDM, information from the superordinate LDM's data store may be merged with information retrieved from the subordinate LDM's data store.

Local changes to a record may occur in an LDM's data store without these changes being propagated to update the corresponding record in another LDM's data store. For example, it may be desired that certain information be maintained and shared locally in an organization, say a business group or work group, but not available outside the group to others in the organization. In this case, the local data store may be updated to include additional or different information. However, the corresponding information in a superordinate LDM's data store is not updated to reflect this additional or different information. In this manner, modifications to a subordinate data store do not propagate to the superordinate data store.

Importantly, a response to a query of a record initiated by an LDM should provide all updated information from the superordinate LDM's data store, as well as any locally overwritten information from the LDM's local data store. In one embodiment of the invention, the query accesses the records in both LDMs, the results of the query are merged so that the information from the superordinate LDM's local data store is reflected in the response, with the information from the LDM's local data store overlaying the superordinated LDM's information.

With reference to FIG. 1, an embodiment of the invention 100 is illustrated in an architectural block diagram. A layered data manager (LDM) 110 is coupled to a local data store, e.g., physical storage 105. LDM 110 comprises a data merge unit 112 coupled to a data access, or data storage, unit 114. Data access unit 114 provides an abstract layer for accessing data store 105, which allows for the invention to integrate different types and versions of data storage media. Flexibility regarding various storage technologies may be achieved in one embodiment by providing for replacement of the data store at runtime, in which case, instantiation of the associated data access unit is provided by a data access unit factory, the configuration of which is the responsibility of the LDM.

In one embodiment, data access unit 114 represents locally available information—the amount of information stored locally may vary from a few locally customized fields up to a complete local store without the use of a superordinate LDM and consequently without the use of a data merge unit.

A request, for example, a query-based request, for an instance of a data object, is received by LDM 110, for example, from a local client. Data merge unit 112 receives the request and passes it to data access unit 114, which processes the request by querying the data store 105 in response to the request.

In accordance with the invention, LDM 110 is coupled to one or more other LDMs such as LDM 120, which, in turn, may be coupled to one or more other LDMs. In this way, a chain of cascaded LDMs form a distributed hierarchical data store. In one embodiment of the invention, the request is forwarded by the data merge unit 112 in LDM 110 to LDM 120. Alternatively, data merge unit 112 initiates a separate request to LDM 120 in response to receiving the original request.

In one embodiment of the invention, LDM 120 resides on or is accessible by a server and manages access to a superordinate data store relative to the data store managed by LDM 110. LDM 120 receives the request from LDM 110 and provides it to data merge unit 122, which in turn provides it to data access unit 124. Data access unit 124 queries the data store and provides the result to data merge unit 124. Data merge unit 122 provides the result to data merge unit 112 in LDM 110 which then merges the result with the result from data access unit 114's query of the subordinate data store 105. In this manner, both the request sent by the client to the local LDM 110 and the subsequent request sent from LDM 110 to LDM 120 are processed, and the results of the two queries are then merged, and happens transparent to the end user at the client that initiated the original request.

The invention provides for hierarchical trees of LDMs, wherein each LDM is responsible for managing one data "layer". The tree can degenerate to a single LDM that only provides local data. To chain LDMs in the manner described above and as illustrated in FIG. 1, each LDM is capable of operating as a subordinate LDM as well as a superordinate LDM. Although several LDM layers can by executed by the same process, to be scalable, the LDMs may be executed by different processes on the same or different processors in the same or different hosts or nodes in a network. In one embodiment of the invention, there is no difference from the perspective of an LDM of a request from a client versus a request from another LDM—an LDM acts as a server for client requests and at the same time acts as a client toward its superordinate LDM.

The strategy for data merging may be very dependent on the semantics of the underlying information and, therefore, in one embodiment of the invention, the data merge unit in an LDM is coupled via a separate defined interface that can be replaced at runtime. To accommodate this, the data merge unit may be instantiated by data merge unit factory, the configuration of which is the responsibility of the LDM. It is important to note that with respect to client requests, the data merge unit is transparent—all update activity only involves the data access unit. Additionally, data stored locally with respect to an LDM may only comprise the minimal data set that is locally customized—all other data is stored in the superordinate LDM(s).

Figure 2:
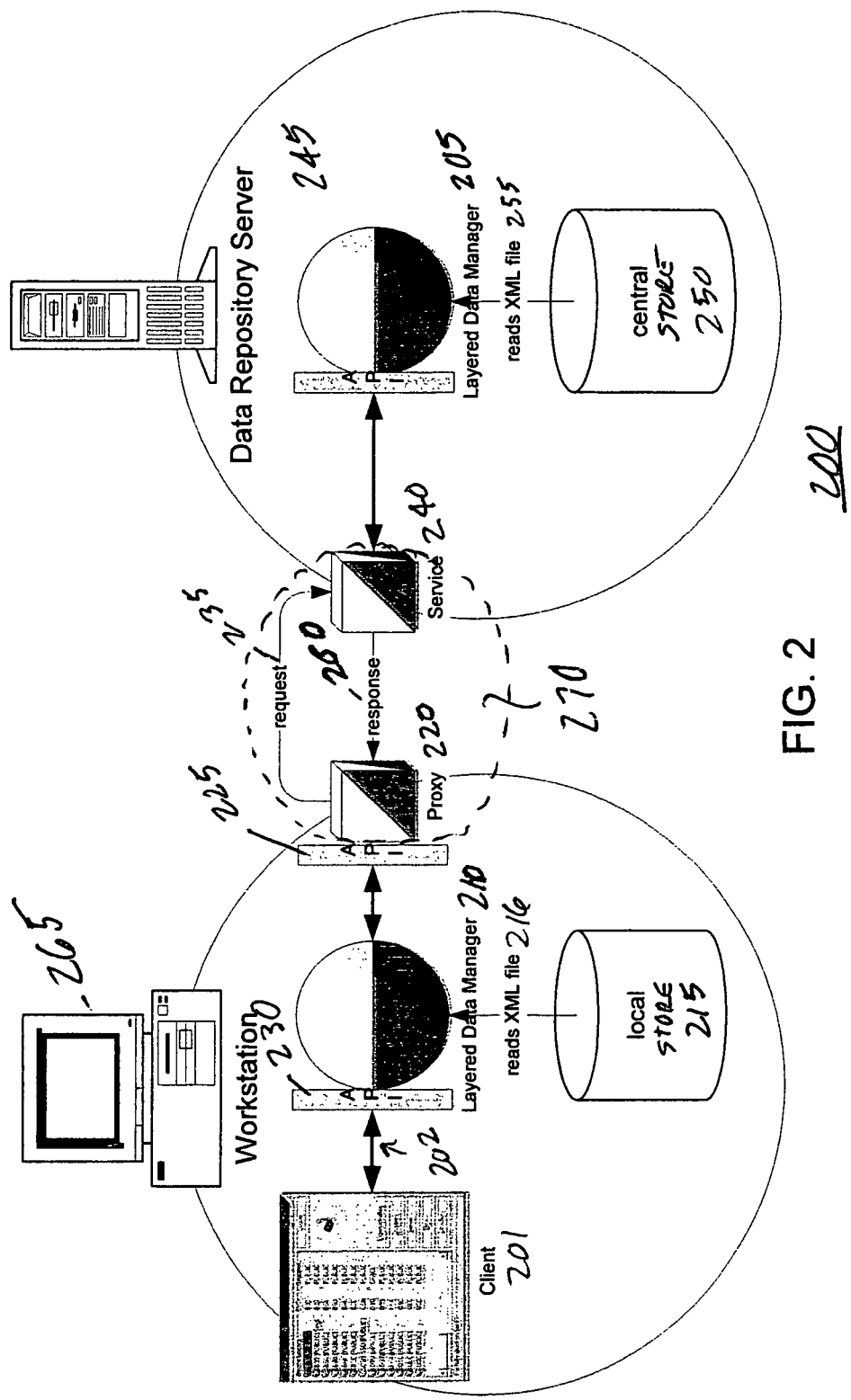
FIG. 2 illustrates an embodiment of the invention.

As illustrated in the diagram 200 in FIG. 2, when an LDM server 245 is used, the local LDM instance 210 first accesses (e.g., imports and parses) the local data store 215 in response to a request 202 from a client 201. In one embodiment, the local data store contains the Uniform Resource Indicator (URI) for LDM server 245 from which to request further data. The URI is provided by the local data store, for example, in an XML file 216, to LDM 210. A local proxy instance 220 is generated for this URI, and an application programmatic interface (API) 225 for the proxy instance is provided that is identical to an API 230 for LDM 210. The LDM instance 210 associated with the local data store 215 may use that API 225 to request the same data from the proxy instance 220. The proxy instance passes a corresponding request 235 to a service 240 on the LDM server 245, which in turn passes it to the server-side LDM 205. The server-side LDM queries its local (central) data store 250, receives the results 255, forwards the same to the service 240, which provides a response 260 with the data to the proxy 220 on the client-side LDM, which in turn passes it to the requesting LDM 210.

It should be noted that LDMs may be implemented according to the same program code, as may be the APIs and proxy and service instances. Doing so provides for the capability to extend the layered data management architecture to include multiple layers of data management in a chain or tree. A superordinate LDM may contain a reference to a further URI that causes the LDM to request data from its superordinate LDM in the same manner as described above. Furthermore, multilayered data storage is possible according to the described embodiments, in which a one to many or many to one relationship exists between, for example LDMs.

For example, in one embodiment of the invention, an LDM is implemented as a reusable software component ("LDM component"), for example, a component developed using java Beans, available from Sun Microsystems, OLE (Object Linking and Embedding), or COM (Component Object Model), both available from Microsoft Corporation. A reusable software component comprises an interface and a method. The component exists autonomously and independently from any other components of either the client workstation 265 or server 245. Any client software application can implement an LDM component, and call it multiple times with requests. Likewise, in one embodiment of the invention, server 245 includes an LDM component, and any server software application can implement the component.

The LDM component may be implemented in two parts: a "service" part, and a "proxy" part, such as the proxy 220 and service 240, described above, and both of these components may be included on separate platforms. For example, proxy 220 is implemented on workstation 265, and service 240 is implemented on server 245 to form a complete LDM 270. A client application 201 and corresponding server application may establish a connection between each other via the LDM component 270, including proxy 220, service 240, and communication medium therebetween, to transmit information between the applications.

Elements of embodiments of the present invention may also be provided as an article of manufacture having an electronically accessible medium for storing the electronically accessible instructions. The electronically accessible medium may include, but is not limited to, flash memory, optical disks, CD-ROMs, DVD ROMs, RAMS, EPROMs, EEPROMs, magnetic or optical cards, or other type of electronically accessible media suitable for storing electronic instructions. For example, embodiments of the invention may be downloaded as a computer program which may be transferred from a remote computer (e.g., a server) to a requesting computer (e.g., a client) by, way of data signals via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. These references are not necessarily all referring to the same embodiment. Furthermore, the particular features, structures or characteristics may be combined as suitable in one or more embodiments of the invention.

What is claimed is:

1. A distributed data management system comprising:
  a central physical data store including a base instance of a data object;
  a first server including one or more processors implementing a superordinate layered data manager adapted to access the central physical data store, wherein the central physical data store resides on a non-transitory computer-readable medium accessible by the one or more processors implementing the superordinate layered data manager;
  a local physical data store including a local instance of the data object, the local instance of the data object including data fields containing local information not replicated to the base instance of the data object;
  a second server including one or more processors implementing a subordinate layered data manager including,
    a data storage module adapted to access the local physical data store to retrieve the local instance of the data object wherein the local physical data store resides on a non-transitory computer-readable medium accessible by the one or more processors implementing the subordinate layered data manager, and
    a data merge module adapted to,
      communicate with the superordinate layered data manager to obtain a current version of the base instance of the data object, and
      merge the current version of the base instance of the data object with the local instance of the data object to create a merged instance of the data object, wherein the local instance of the data object overlays the base instance of the data object within the merged instance, and
      deliver the merged instance of the data object in response to a request for the data object, to a requesting client, the requesting client in communication with the subordinate layered data manager.

2. The distributed data management system of claim 1, wherein the requesting client is a second subordinate layered data manager adapted to access a third physical data store to retrieve a third instance of the data object.

3. The distributed data management system of claim 2, wherein the second subordinate layered data manager includes:
  a data merge module adapted to merge the merged instance of the data object with the third instance of the data object to create a second merged instance of the data object, and deliver the second merged instance of the data object in response to a request for the data object from a second client, the second client in communication with the second subordinate layered data manager.

4. The distributed data management system of claim 1, wherein the local physical data store is adapted to store local data objects, the local data objects are data objects replicated from the central physical data store and altered by information specific to the local physical data store, the altered information is not replicated to the central physical data store.

* * * * *